United States Patent
Shand

(10) Patent No.: US 9,097,372 B2
(45) Date of Patent: Aug. 4, 2015

(54) TURBULENCE FREE RING

(76) Inventor: Ajay Shand, Karnataka (IN)

(*) Notice: Subject to any disclaimer, the term of this patent is extended or adjusted under 35 U.S.C. 154(b) by 0 days.

(21) Appl. No.: 13/991,305

(22) PCT Filed: Dec. 5, 2011

(86) PCT No.: PCT/IN2011/000827
§ 371 (c)(1),
(2), (4) Date: Jul. 24, 2013

(87) PCT Pub. No.: WO2012/077132
PCT Pub. Date: Jun. 14, 2012

(65) Prior Publication Data
US 2013/0300112 A1  Nov. 14, 2013

(30) Foreign Application Priority Data
Dec. 3, 2010  (IN) .......................... 3660/CHE/2010

(51) Int. Cl.
*F16L 25/00* (2006.01)
*F16L 21/02* (2006.01)
*E21B 17/042* (2006.01)
*F16L 15/00* (2006.01)
*F16L 21/04* (2006.01)

(52) U.S. Cl.
CPC ............ *F16L 21/022* (2013.01); *E21B 17/042* (2013.01); *F16L 15/008* (2013.01); *F16L 21/04* (2013.01)

(58) Field of Classification Search
CPC ....... F16L 15/004; F16L 15/001; F16L 15/06; F16L 15/04; F16L 15/08; F16L 15/003

USPC ............... 285/333, 355, 334.1, 334.2, 332.3, 285/334.3; 277/612
See application file for complete search history.

(56) References Cited

U.S. PATENT DOCUMENTS

| | | | | |
|---|---|---|---|---|
| 1,282,959 A | * | 10/1918 | Sears ............................ | 277/612 |
| 1,909,075 A | * | 5/1933 | Ricker et al. ................ | 285/123.3 |
| 2,517,290 A | * | 8/1950 | De Moude et al. ........... | 277/612 |
| 2,766,998 A | * | 10/1956 | Watts et al. ................. | 285/334.2 |
| 3,339,945 A | * | 9/1967 | McCrory, Jr. et al. .......... | 285/55 |
| 4,480,861 A | * | 11/1984 | Cann, Jr. .................... | 285/334.2 |
| 4,537,428 A | * | 8/1985 | Landriault .................... | 285/333 |
| 4,762,344 A | | 8/1988 | Perkins | |

(Continued)

FOREIGN PATENT DOCUMENTS

| | | |
|---|---|---|
| DE | 1068068 | 10/1959 |
| DE | 3542523 C1 | 7/1987 |

(Continued)

OTHER PUBLICATIONS

"International Application No. PCT/IN2011/000827, International Search Report mailed Jan. 18, 2013", (Jan. 18, 2013), 4 pgs.

*Primary Examiner* — Aaron Dunwoody
(74) *Attorney, Agent, or Firm* — Schwegman Lundberg & Woessner, P.A.

(57) ABSTRACT

The present subject matter relates to a turbulence free ring (TFR), for a pipe-coupler unit. The TFR includes a main portion, forming a closed loop of predetermined diameter, webbed portions extending in an axial direction from the main portion, a fitment edge, extending in a radially outward direction from the main portion, and a raised section having a substantially flat top surface. The raised section extends in a radially inward direction from the main portion.

12 Claims, 3 Drawing Sheets

(56) References Cited

U.S. PATENT DOCUMENTS 4,955,645 A 9/1990 Weems
6,039,319 A 3/2000 Coonce et al.

FOREIGN PATENT DOCUMENTS

GB 2180903 A * 4/1987 .............. F16L 33/16
WO WO-2009/052804 A1 4/2009

* cited by examiner

TURBULENCE FREE RING

PRIORITY CLAIM TO RELATED APPLICATIONS

This application is a U.S. National Stage Application filed under 35 U.S.C. §371 of PCT/IN2011/000827, filed Dec. 5, 2011, and published as WO 2012/077132 A2 on Jun. 14, 2012, which claims priority to Indian Application No. 3660/CHE/2010, filed Dec. 3, 2010, which applications and publication are incorporated by reference as if reproduced herein and made a part hereof in their entirety, and the benefit of priority of each of which is claimed herein.

TECHNICAL FIELD

The present subject matter relates to pipe-coupler units and, particularly but not exclusively, to a turbulence free ring (TFR) used in the pipe-coupler units.

BACKGROUND

Generally pipe systems convey fluids from one point to another. In underground applications, such as bore wells, the pipe systems extend several meters below the surface of the earth. Further, in these underground pipe systems, a large capacity motor is used to draw the water from a source to a further point of interest.

Generally, the fluid, such as water, is drawn from the underground source to the further points of interest in as efficient a way as possible. Strategies exist in reducing the motor running costs, increasing the life of the pipe joints, reducing a number of wear and tear components, using more durable components etc.

SUMMARY

A turbulence free ring (TFR) is described therein. In an embodiment, a pipe-coupler unit of a pipe system, for transporting fluids from one point to another, includes a TFR. In one embodiment, the TFR includes a main portion forming a closed loop of predetermined diameter, webbed portions extending in an axial direction from the main portion, a fitment edge, extending in a radially outward direction from the main portion, and a raised section having a substantially flat top surface. The raised section extends in a radially inward direction from the main portion.

These and other features, aspects, and advantages of the present subject matter will be better understood with reference to the following description and appended claims. This summary is provided to introduce a selection of concepts in a simplified form. This summary is neither intended to identify key features or elements of the claimed subject matter nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
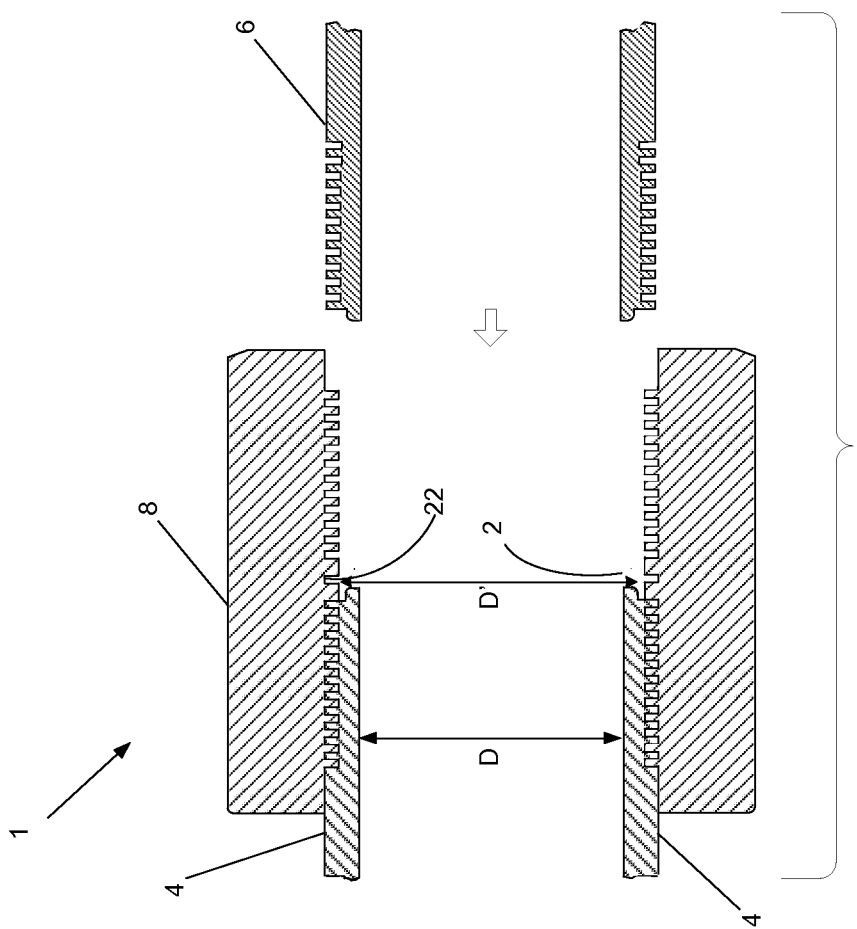
FIG. 1 shows a cross section of a pipe-coupler unit according to an embodiment of the present subject matter during an assembly process.

Pipe systems generally transport fluids from one point of interest to another. In an example, pipe systems may be installed underground in order to transport ground water from a source to a further point of interest, such as a water processing plant above ground level. Further, in substantially lengthy underground pipe systems, large capacity motors are utilized to draw the ground water from the source. Generally, in these substantially lengthy underground pipe systems, a high level of flow efficiency is desired with low running costs. The flow efficiency may be measured as a ratio of the volume of water extracted from source to the volume of water output at the point of interest, such as for example, the water processing plant. Furthermore, in order to maximize an output of water from the pipe system, a substantially laminar fluid flow is obtained. In the lengthy underground pipe systems, the fluid, such as water, that is being transported needs to be conveyed over extremely long distances. Furthermore, the transportation is to be performed incurring minimum losses along the path of the fluid. Additionally, losses, even if minor, are magnified to major proportions due to the sheer length of the pipe system. Therefore, in order to provide a uniform flow surface over the course of the fluid flow, techniques, such as providing a smooth inner surface of the pipes and coupler and reducing the number of uneven curves and transitions in pipe diameter sizes, are conventionally used.

Further, in the known pipe systems, sealing means, for example gaskets, are incorporated at joints, such as a pipe-coupler joint, to reduce the chances of fluid leakage. Pipe-coupler units may be provided in order to reduce the length of the pipe system into substantially shorter pipe-coupler sections. This is beneficial in easing the installation of the pipe system and facilitates in maintenance of the pipe system. Generally, the pipe-coupler unit includes a pipe, coupled with a coupler, and a plurality of such pipe-coupler units may be coupled to each other by fastening means, such as threads, in order to form the pipe system.

Moreover, during the assembly of the pipe system, a gap may be formed between the pipes coupled within the coupler. This gap creates a sudden change in flow cross section and disturbs the dynamics of the fluid flow. Since this gap may be present in all the fixed and removable pipe interfaces within the pipe-coupler unit, the resistance to fluid flow is magnified. Due to resulting turbulent fluid flow, the life and performance of other components of the pipe system, such as a pump motor, impeller, and bearings, are affected. Consequently, in the long run the output of the system is reduced, resulting in financial losses.

The present subject matter describes a turbulence free ring (TFR). In one embodiment, the TFR includes a main portion forming a closed loop of predetermined diameter. Furthermore, the TFR has webbed portions extending in an axial direction from the main portion, a fitment edge extending in a radially outward direction from the main portion, and a raised section having a substantially flat top surface. The raised section extends in a radially inward direction from the main portion. In said embodiment, the axis of the TFR extends through the center of the ring, perpendicular to a plane of the ring.

A pipe system is made up of a plurality of the pipe-coupler units that include fixed pipes coupled to couplers. A free end of the fixed pipe is coupled with the coupler of the subsequent pipe-coupler unit and so forth. This fixed pipe of the subsequent pipe-coupler unit is referred to henceforth as a removable pipe.

For explanatory purposes, a single pipe-coupler unit, i.e., a single fixed pipe, removable pipe and coupler is discussed henceforth. A person skilled in the art would appreciate that these pipe-coupler units are repeated multiple times throughout the system.

In an embodiment, the pipe-coupler unit includes the fixed pipe fastened to the coupler in a non-removable manner. This permanent joint is aided by a locking means, such as a wire locking mechanism. The removable pipe is then fastened in a removable manner to the coupler during assembly of the pipe system. Gaskets and sealing rings are used to seal gaps at the interface of the fixed pipe and the coupler and also at the interface f the removable pipe and the coupler.

In an embodiment, the TFR is fitted into a gap formed between the fixed pipe and the removable pipe in the coupler. In said embodiment, the TFR may be provided with a profile corresponding to a shape of the gap. In this manner, a press fit of the TFR may be facilitated in said gap.

During assembly of the pipe system, the removable pipe is fastened to a removable pipe coupler end of the coupler. As the removable pipe is inserted in the coupler, the removable pipe exerts a force on the TFR fitted in the gap. Consequently, due to the compressive force exerted on the TFR by the removable pipe, and a corresponding reactive force applied by the fixed pipe, a raised section of the TFR extends in an upward direction. Finally, when the removable pipe is securely fastened to the coupler, the TFR is compressed to such an extent that a top surface of the TFR aligns itself with an inner surface of the pipe sections, i.e., the fixed pipe and the removable pipe. This way, the fluid flow remains laminar or streamlined, thus increasing an output of the pipe system. Furthermore, additional load on ancillary components, such as pump motors, impellers, and bearings, is reduced.

These and other advantages of the present subject matter are described in greater detail in conjunction with the figures.

FIG. 1 shows a cross section of a pipe-coupler unit 1 during an assembly process, according to an embodiment of the present subject matter. The pipe-coupler unit 1 includes a coupler 8 and a fixed pipe 4. The fixed pipe 4 may be coupled to the coupler 8 via coupling means, such as threads or a wire locking mechanism. A removable pipe 6 is shown entering a removable pipe coupler end of the coupler 8 in the direction shown by an arrow in the figure. In an embodiment, the removable pipe 6 may be a fixed pipe of a subsequent pipe-coupler, unit 1. Further a region of a gap 2, which is subsequently formed between the fixed pipe 4 and the removable pipe 6, is shown in FIG. 1. Moreover, an internal groove 22 is provided running along an inner side of the coupler 8.

In an embodiment, the coupling means are in the form of threads on an inner side of the coupler 8 and on an outer side of the fixed pipe 4. The inner threads of the coupler 8, engage with the outer threads of the fixed pipe 4 to fasten the fixed pipe 4 with the coupler 8.

In an embodiment, the coupler 8 and the fixed pipe 4 have an equal number of corresponding threads. In this manner, a load on the pipe system and the pipe-coupler unit 1 may be equally distributed. In turn, the stability and life of the pipe system may be improved due to the equal distribution of loads.

In another embodiment, the coupler 8 and the fixed pipe 4 have an unequal number of corresponding threads. In said embodiment, the threads may be unequal in number to accommodate additional sealing or locking mechanisms in the pipe-coupler unit 1. In an example, a wire locking mechanism may be provided in the pipe-coupler unit 1, in a groove adjacent to the threads at either one or both the pipe coupler ends, i.e., the fixed pipe coupler end and the removable pipe coupler end.

In another embodiment, the fixed pipe 4 and the coupler 8 are provided with a taper to facilitate a tapered fit. In said embodiment, the taper is provided by reducing an external diameter of the fixed pipe 4 and reducing an internal diameter of the coupler 8. In an example, the outer diameter of the fixed pipe 4 is reduced towards a peripheral edge of the fixed pipe 4.

In the pipe-coupler unit 1, due to the gap 2, a sudden change in flow diameter, i.e., an increase and decrease in flow diameter, occurs, causing the laminar flow of the fluid to be disrupted resulting in sudden swirling and/or tumbling motion of the fluid. This turbulence may cause detrimental effects in the pipe system, such as reduced flow rates and additional load on a pump motor (not shown). As shown in FIG. 1, a fixed pipe inner diameter D suddenly increases to a coupler inner diameter D' in the region of the gap 2. As the fluid enters the pipe coupler unit 1, the fixed pipe inner diameter D acts as an effective flow diameter for the fluid. Furthermore, as the fluid passes over the gap 2, the effective flow diameter becomes the coupler inner diameter D'. Due to said sudden increase in the flow diameter, the gap 2 acts as a point of turbulence.

Figure 2:
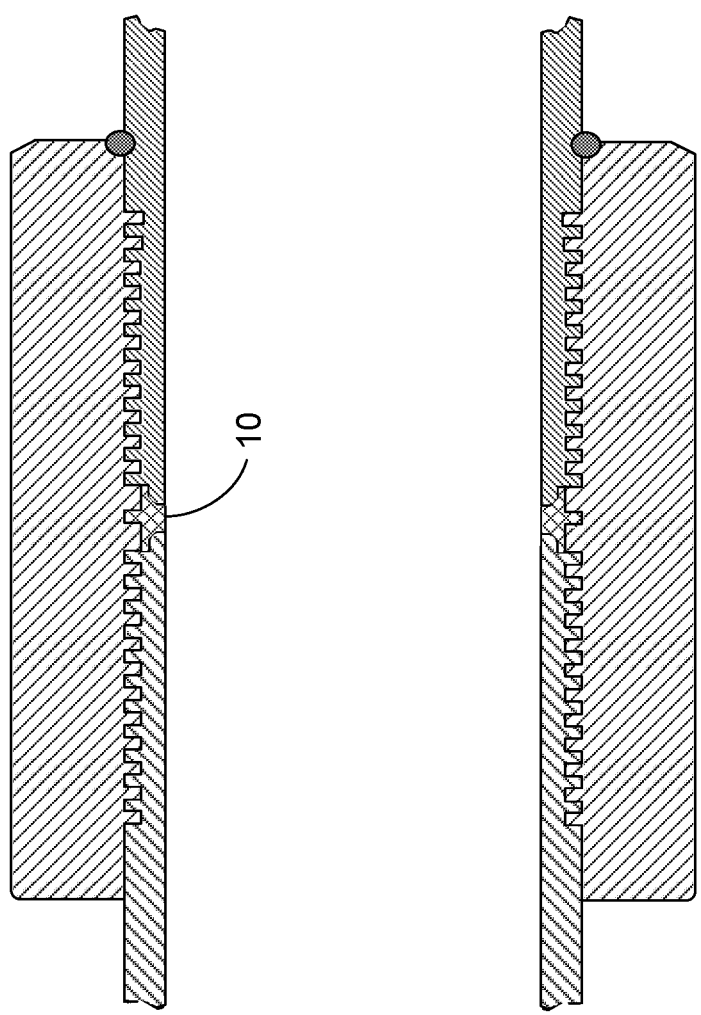
FIG. 2 shows the pipe-coupler unit in FIG. 1 in an assembled state with a turbulence free ring (TFR) according to an embodiment of the present subject matter.

FIG. 2 shows the pipe-coupler unit 1 shown in FIG. 1 in an assembled state with a TFR 10 provided in the gap 2, according to an embodiment of the present subject matter. In said embodiment, the TFR 10 is provided between the fixed pipe 4 and the removable pipe 6. For clarity purposes, parts with the same reference numeral as shown in FIG. 1 have not been marked in FIG. 2. The TFR 10 bridges the gap 2 effectively to provide a level surface for the fluid to flow. This level surface provides for the fluid to flow in a streamlined manner. In one embodiment, the TFR 10 includes webbed portions 14, a fitment edge 16, and a raised section 18 having a top surface 20, which will be explained in detail at a later stage. The level and uniform surface effectively reduce a resistance to fluid flow, which in turn reduces the load on components of the pipe system, such as the pump motor, impeller, and bearings, thus adding life to these ancillary components. In an embodiment, the TFR 10 is designed with a cross sectional profile substantially corresponding to the cross sectional profile of the gap 2 to provide the level and uniform surface.

During an assembly of the pipe system, the removable pipe 6 is coupled with the removable pipe coupler end of the coupler 8. As the removable pipe 6 is inserted in the coupler 8, the removable pipe 6 exerts a compressive force on the TFR 10 present in the gap 2. Consequently, due to the compressive force exerted on the TFR 10 by the removable pipe 6 and a corresponding reactive force applied by the fixed pipe 4, the raised section 18 of the TFR 10 extends further in an upward direction towards the center of the pipe-coupler unit 1. Finally, in an implementation, when the removable pipe 6 is securely fastened to the coupler 8, the TFR 10 is compressed to such an extent that the top surface (20) of the raised section 18 of the TFR 10 aligns itself with an inner surface of the pipe-coupler unit 1. In one embodiment, the inner surface of the pipe-coupler unit 1 may be the inner surface of the fixed pipe 4 and the removable pipe 6 along which the fluid flows. In this manner, the top surface 20 of the TFR 10 is substantially in line with the inner surface of the pipe-coupler unit 1.

Figure 3:
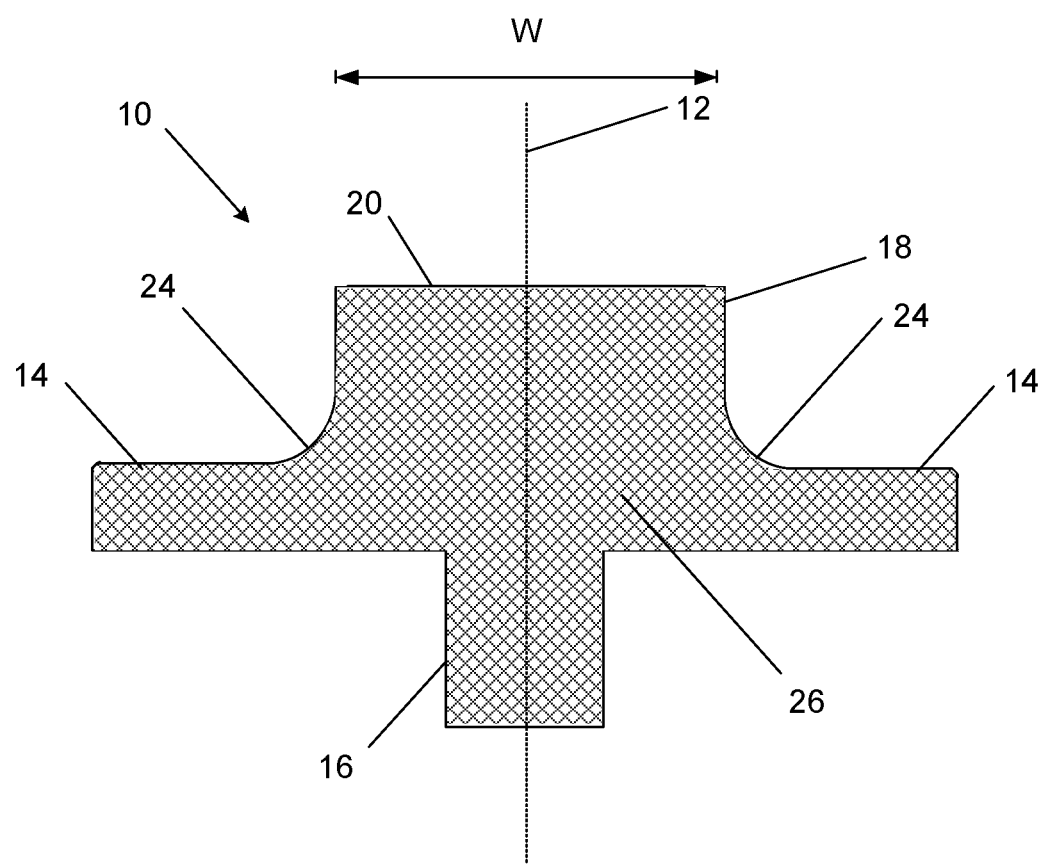
FIG. 3 shows a cross section of the TFR according to an embodiment of the present subject matter.

FIG. 3 shows a cross section of the TFR 10 according to an embodiment of the present subject matter. As mentioned earlier, the cross sectional shape or profile of the TFR 10 is provided substantially similar to a shape of the gap 2 between the fixed pipe 4, the removable pipe 6, and the coupler 8.

As shown in FIG. 3, in said embodiment, the TFR 10 is configured symmetrically about its vertical axis 12. In said embodiment, the vertical axis 12 passes through a center of the fitment edge 16 and the raised section 18 of the TFR 10.

In one embodiment, the TFR 10 includes a main portion 26. The main portion 26 extends in a closed loop to form a ring like structure of the TFR 10. A diameter of the ring like structure may be selected depending on the fixed pipe inner diameter D and the coupler inner diameter D'. The TFR 10 may further include the webbed portions 14, which extend in an axial direction from the main portion 26 with reference to an axis of the TFR 10 passing through the center of the TFR 10 perpendicular to the plane of the TFR 10. Furthermore, the webbed portions 14 facilitate a stable fixture of the TFR 10 in the pipe-coupler unit 1 by providing a substantially close fit in the gap 2.

Additionally, the TFR 10 may include a fitment edge 16, which extends in a radially outward direction from the main portion 26. The fitment edge 16 fits in a tight fitting manner into an internal groove 22 (shown in FIG. 1) provided in the inner side of the coupler 8. In an embodiment, a width of the fitment edge 16 is greater than a width of the internal groove 22, in order to facilitate a press fit of the TFR 10. Further, the TFR 10 can include a raised section 18. In an embodiment, the raised section 18 may be an extension of the main portion 26. In said embodiment, the raised section 18 extends in a radially inward direction from the main portion 26 in a direction opposite to the fitment edge 16. Moreover, a top surface 20 of the raised section 18 may be substantially flat, to provide a level and uniform surface for the fluid flow.

In an example, the top surface 20 of the raised section. 18 may be substantially flat. In said example, before the assembly of the pipe-coupler unit 1, a height of the TFR 10 may be provided lesser than a depth of the gap 2. In said example, before complete assembly, the top surface 20 of the raised section 18 lies below the inner surface of the pipe-coupler unit 1. In one implementation, before assembly, the top surface 20 of the raised section 18 lies 0.2 mm below the inner surface of the pipe-coupler unit 1. The height of the TFR 10 may be measured as the distance from the bottom of the fitment edge 16 to the top surface 20, and the depth of the gap 2 may be measured from the bottom of the internal groove 22 to the inner surface of the pipe-coupler unit 1. The TFR 10 is configured with the top surface 20 below the inner surface of the pipe-coupler unit 1 in order to compensate for any error in dimensional tolerances in the pipes of the pipe system.

As described earlier, during the assembly process of the pipe-coupler unit 1, the removable pipe 6 exerts a compressive force on the TFR 10. Furthermore, the fixed pipe 4 exerts a corresponding reactive force on the TFR 10, which causes the raised section 18 to rise such that in the assembled state of the pipe-coupler unit 1, the top surface 20 of the raised section 18 is substantially in line with the inner surface of the pipe-coupler unit 1. In one example, the top surface 20 of the raised section 18 lies 0.1 mm below the inner surface of the pipe-coupler unit 1 in the assembled state. As described earlier, in order to compensate for any error in dimensional tolerances, the TFR 10 is configured so that the top surface 20 of the raised section 18 lies below the inner surface of the pipe-coupler unit 1 after assembly. In such a case, any loss in pressure head of the liquid flowing therein, will be comparatively less than a case where the top surface 20 of the raised section 18 lies above the inner surface of the pipe-coupler unit 1.

In an example, the top surface 20 of the raised section 18 may be concave. In said example, the top surface 20 is concave towards the inner surface of the pipe-coupler unit 1. In said example, the raised section 18 may be provided substantially in line with the inner surface of the pipe-coupler unit 1. During the assembly as described earlier, as the removable pipe 6 is inserted into the pipe-coupler unit 1, the removable pipe 6, exerts a compressive force on the TFR 10. Furthermore, the fixed pipe 4 offers a reactive force on the TFR 10 and as a result, the top surface 20 of the raised section 18, which has a concave profile, rises to be substantially flat and in line with the inner surface of the pipe-coupler unit 1. Therefore, in said example, in the assembled state of the pipe-coupler unit 1, a substantially flat top surface 20 of the TFR 10 is provided.

In an embodiment, a width W of the top surface 20 is between 4 mm and 15 mm depending on the diameter of the pipe system used therein. In an embodiment, the fixed pipe 4 and the removable pipe 6 may have diameters in a range between about 1 inch and 6 inches. Depending on these values, the dimensions of the TFR 10 mentioned above are variable.

In an embodiment, a width of the TFR 10 is between 10 mm and 20 mm. Furthermore the TFR 10 is made of a material offering sealing properties against a variety of fluids, such as rubber.

In an embodiment, the raised section 18 transforms into the webbed portions 14 via a curved section 24. The curved section 24 facilitates the raised sections 18 to extend in height while essentially maintaining the top surface 20 substantially flat. In an embodiment, the curved section 24 is configured with a radius in a range of about 0.75 mm to about 2 mm.

The TFR 10, according to the present subject matter, provides a level flow surface thus reducing turbulent flow of fluid in the pipe system. Consequently, load on various ancillary components of the pipe system, such as motor, bearings, and impellers, is considerably reduced, thus increasing service life of the ancillary components of the pipe system. The TFR 10 may be made with elastic materials, such as natural or synthetic rubber, which are also cost effective. In one example, the TFR 10 can be made with EPDM (Ethylene Propylene Diene Monomer) rubber, as it provides water resistant and sealant properties.

Furthermore, the TFR 10, according to the present subject matter, provides additional sealing against ingress of fluid into and leakage of fluid from the pipe system.

The TFR 10, according to the present subject matter, increases the life of the pipe system by reducing turbulence in the fluid system. Due to this, unbalanced loads due to turbulent flow at load bearing points are eliminated. Output rates are maximized and running costs of a water drawing system is minimized.

Although the subject matter has been described in considerable detail with reference to certain embodiments thereof, other embodiments are possible. It is to be understood that the appended claims are not necessarily limited to the features described herein. Rather, the features are disclosed as embodiments of the Turbulence Free Ring and the pipe-coupler unit having the Turbulence Free Ring.

I claim:
1. A pipe-coupler unit comprising:
a coupler having a fixed pipe coupler end and a removable pipe coupler end; and
a fixed pipe coupled to the fixed pipe coupler end;
wherein the coupler comprises a turbulence free ring provided in an internal groove of the coupler, the turbulence free ring comprising:
a main portion forming a closed loop;
webbed portions extending in an axial direction from the main portion
a fitment edge, extending in a radially outward direction from the main portion; and
a raised section having a substantially flat top surface, the raised section extending in a radially inward direction from the main portion, wherein each of the webbed portions is connected to the raised section via a curved section, and wherein the curved section conforms an arc of a circle of a radius within a range of about 0.75 mm to 2 mm.

2. The pipe-coupler unit as claimed in claim 1, wherein the turbulence free ring is fitted in the internal groove of the coupler, by the fitment edge.

3. The pipe-coupler unit as claimed in claim 1, wherein the coupler comprises:
fixed pipe coupler end threads on the fixed pipe coupler end to couple to the fixed pipe; and
removable pipe coupler end threads in the removable pipe coupler end to couple to a removable pipe.

4. The pipe-coupler unit as claimed in claim 3, wherein the fixed pipe coupler end threads and the removable pipe coupler end threads are equal in number.

5. The pipe-coupler unit as claimed in claim 1, wherein the turbulence free ring is provided in a region between the fixed pipe and the removable pipe.

6. The pipe-coupler unit as claimed in claim 1, wherein the top surface of the raised section of the turbulence-free ring lies below an inner surface of the fixed pipe in an assembled state of the pipe-coupler unit.

7. The pipe-coupler unit as claimed in claim 6, wherein the top surface of the raised section is 0.1 millimeter below the inner surface of the fixed pipe.

8. The pipe-coupler unit as claimed in claim 3, wherein the top surface of the raised section of the turbulence free ring is substantially in line with an inner surface of the fixed pipe and the removable pipe.

9. A turbulence free ring for a pipe-coupler unit, the turbulence free ring comprising:
a main portion forming a closed loop;
webbed portions extending in an axial direction from the main portion;
a fitment edge, extending in a radially outward direction from the main portion; and
a raised section having a substantially flat top surface, the raised section extending in a radially inward direction from the main portion, wherein each of the webbed portions is connected to the raised section via a curved section, and wherein the curved section conforms an arc of a circle of a radius within a range of about 0.75 mm to 2 mm.

10. The turbulence free ring as claimed in claim 9, wherein the turbulence free ring has a cross section that is symmetrical about an axis passing through a center of the fitment edge and the raised section.

11. The turbulence free ring as claimed in claim 9, wherein the turbulence free ring is made of an elastic material.

12. The turbulence free ring as claimed in claim 9, wherein the turbulence free ring is made of EPDM (Ethylene Propylene Diene Monomer) rubber.

* * * * *